Figure 1:
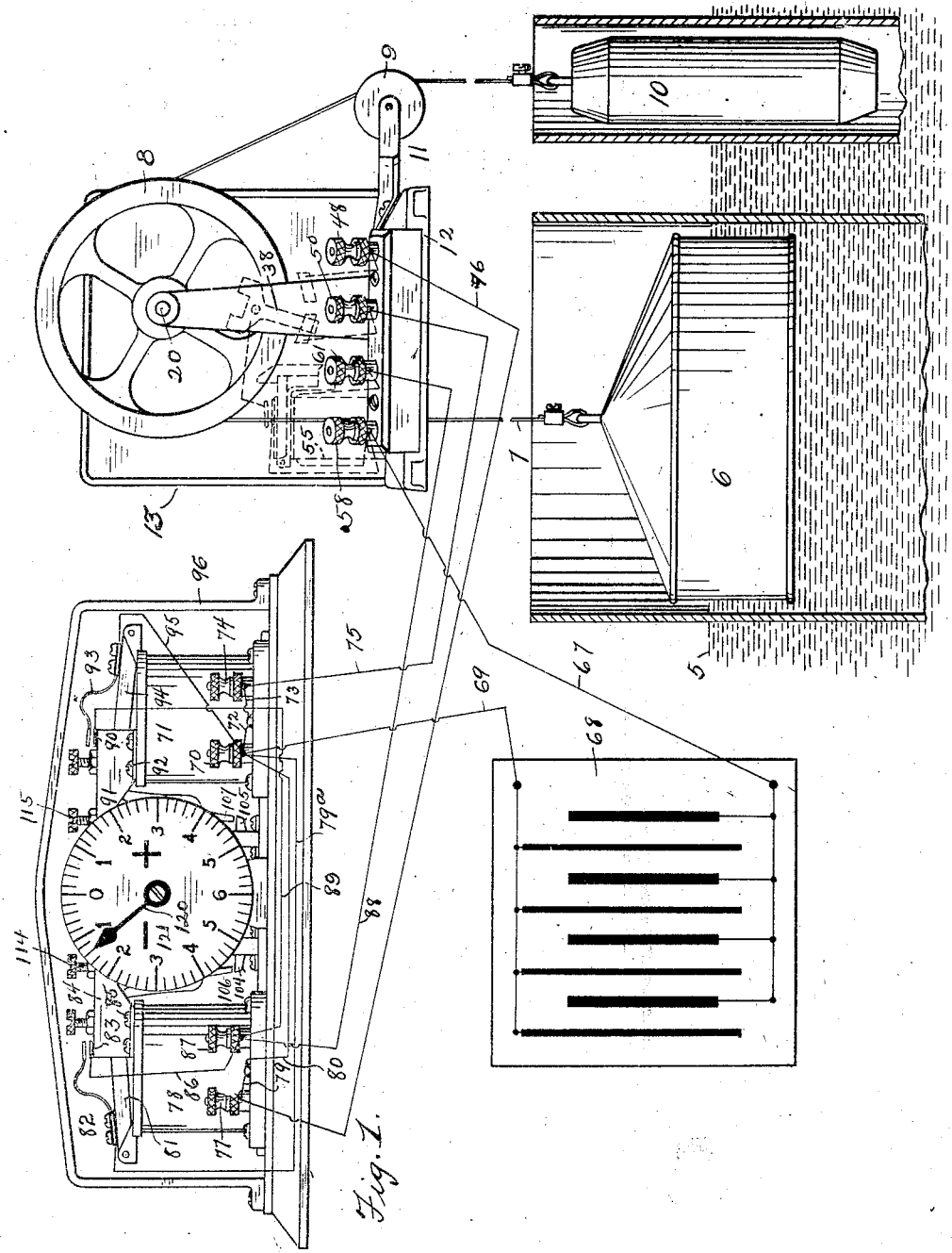

S. Q. KLINE, Jr.
DEVICE FOR INDICATING LIQUID LEVELS AT A DISTANCE.
APPLICATION FILED NOV. 5, 1914.

1,162,699.

Patented Nov. 30, 1915.
3 SHEETS—SHEET 1.

Witnesses

Inventor
Seth Q. Kline Jr.

Shephud Campbell
His Attorneys

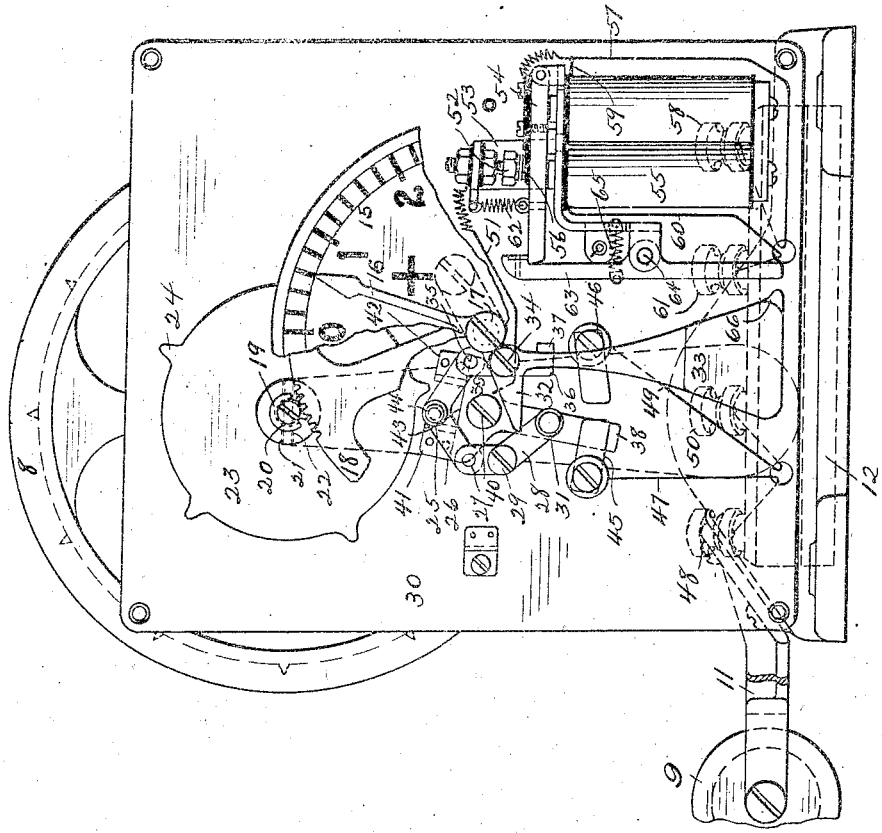
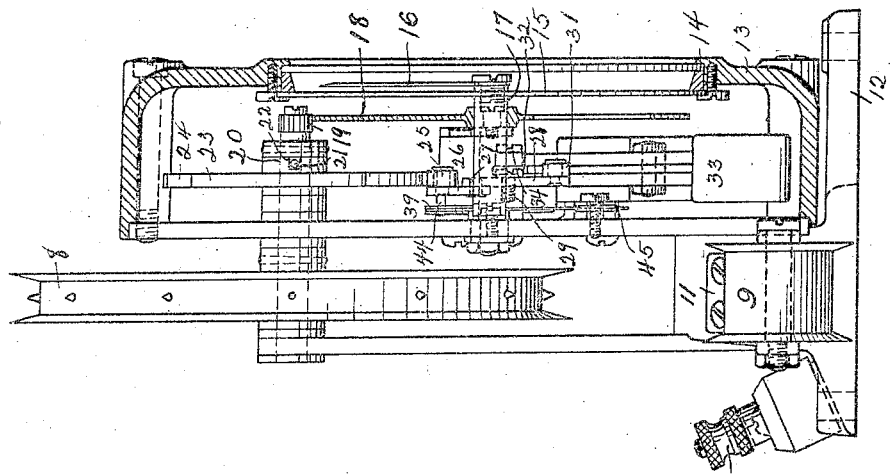

S. Q. KLINE, Jr.
DEVICE FOR INDICATING LIQUID LEVELS AT A DISTANCE.
APPLICATION FILED NOV. 5, 1914.
1,162,699.
Patented Nov. 30, 1915.
3 SHEETS—SHEET 3.
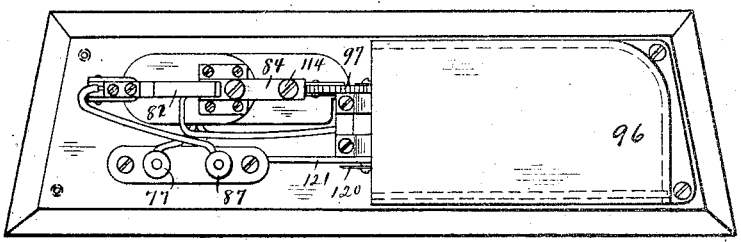
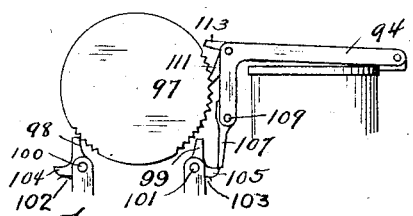
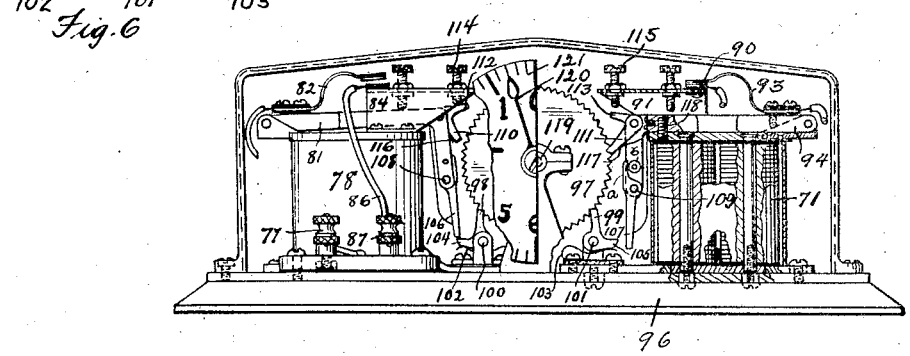

UNITED STATES PATENT OFFICE.

SETH Q. KLINE, JR., OF WASHINGTON, DISTRICT OF COLUMBIA.

DEVICE FOR INDICATING LIQUID-LEVELS AT A DISTANCE.

1,162,699.　　　　　Specification of Letters Patent.　　Patented Nov. 30, 1915.

Application filed November 5, 1914.　Serial No. 870,461.

*To all whom it may concern:*

Be it known that I, SETH Q. KLINE, Jr., a citizen of the United States of America, residing at Washington, District of Columbia, have invented certain new and useful improvements in Devices for Indicating Liquid-Levels at a Distance, of which the following is a specification.

This invention relates to an apparatus for indicating at a distant point the level of a body of water, and it has for its object the provision of improved means for electrically actuating at a distant point indicating mechanism selected and controlled by suitable selecting and controlling means actuated by the rise and fall of a float which rises and falls with the liquid the level of which it is desired to indicate at a distant point.

Further objects and advantages of the invention will be set forth in the detailed description which now follows.

In the accompanying drawing, Figure 1 is a diagrammatic view illustrating the arrangement of the system, Fig. 2 is a view partly in elevation and partly in transverse section of a circuit selecting and controlling mechanism hereinafter described, Fig. 3 is a face view of the mechanism shown in Fig. 2, with certain of the parts removed or broken away, Fig. 4 is a plan view of the indicating mechanism with a part of the casing removed, Fig. 5 is a front elevation of the indicating mechanism with certain of the parts removed and with some of the parts in section, and Fig. 6 is a detailed view illustrating the locking pawls hereinafter described.

Like numerals designate corresponding parts in all of the figures of the drawing.

Referring to the drawing and more particularly to Fig. 1, numeral 5 designates a body of water the height of which it is desired to indicate at a distant point. A float 6 rises and falls with the water, and this float has connected thereto a cord, wire, or cable 7, which passes over a grooved pulley 8 and over an idler pulley 9, and has attached to its opposite end a counter weight 10. The idler pulley 9 is carried by a bearing 11 which is secured to the base block 12 of a circuit selecting and controlling mechanism which will now be described.

Mounted upon the base block 12 is a suitable casing 13 provided with a sight opening 14 through which a dial 15 is visible. A hand or pointer 16 moves over this dial to constitute a local indicator. The pointer 16 is carried by a shaft 17 and this shaft carries a gear wheel 18 which meshes with a pinion 19 that is fast upon a shaft 20, and the pulley 8 is likewise fast upon this shaft. It is apparent therefore, that through these connections movement of the float will be imparted to the pointer 16. The shaft 20 carries a pin 21 which extends beyond the shaft and enters cut-out portions 22 of the hub of a disk 23, and these outturned portions are of such width that there is a slight lost motion between the disk 23 and shaft 20, the purpose of which will be hereinafter set forth. The disk 23 is provided with peripheral lugs 24, which in their rotation are arranged to contact with a roller 25 that is mounted upon an angle arm 26. This angle arm is pivoted at 27 to one end of a bent lever 28, which lever is in turn pivoted at 29 to a plate 30. At its other end this lever carries a roller 31. Therefore, when the disk 23 rotates in a clockwise direction, (see Fig. 3) and one of the lugs 24 contacts with roller 25, angle arm 26 is shifted bodily to the left and the bent lever 28 is swung upon its pivot 29 to cause the roller 31 to contact with and raise an extension 32 of a weight 33, which weight is pivoted at 34. It is apparent that this will swing the lower part of the weight toward the left in Fig. 1. If, however, the movement of the water is such as to cause the disk to rotate in an anti-clockwise direction, then the movement of the angle arm 26 will be toward the right in Fig. 3, and the weight will be moved in the same direction as before, due to the fact that the end of the angle arm opposite to the pivot 27, is pivoted at 35 to a lever 36 which has a projection 37 engaging behind a portion of the weight, and which lever is pivoted upon the pivot 34. Therefore, when the angle arm 26 is moved bodily toward the right, the lower end of lever 36 will be moved toward the left and the weight will be moved in the same direction as before. But while the movement of this weight is always the same, the movements of the disk 23 in one direction or the other are caused to actuate a switch to select one or the other of a pair of circuits. This switch comprises a blade 38 and a head 39 and is pivoted at 40 to plate 30. The head carries extensions 41 and 42 which are spaced from each other to leave a recess 43 between them, in which recess a pin 44, coincident with roller 25, plays. The blade 38 is arranged to be moved into engagement with either of contacts 45 or 46. Contact 45 is in communication, through a conductor 47, with a binding post 48, while contact 46 is in communication, through a conductor 49, with a binding post 50.

The switch blade proper is connected by a conductor 51 with a contact element 52 that is carried by a fixed support 53. The armature bar 54 of a magnet 55 carries a complemental contact point 56, which is in communication, by a conductor 57 with a binding post 58. A branch 59 leads from this conductor 57 through the windings of the magnet 55 and through a conductor 60 to a binding post 61. A spring 62 normally tends to lift the armature bar 54 to bring the contacts 52 and 56 into engagement with each other. But this bar is normally restrained by a latch 63 which is pivoted at 64 and is normally drawn by a spring 65 into position to engage the armature bar and to restrain it from moving upwardly. Now, therefore, if the disk 23 be rotated in a clockwise direction in Fig. 3, and one of the lugs 24 thereof contacts with roller 25, the switch is moved to bring the lower end of its blade into engagement with contact 46, and at the same time the weight is lifted as described. As soon, however, as the lug passes over the center of the roller, the lost motion-engagement provided by pin 21 and the cut-out portion 22 of the hub of the disk permits this disk to have a quick, forward movement, and this in turn permits the weight to drop freely to restore arm 26 and the connected parts to neutral position; and when this weight drops, a tail 66 thereof contacts with the lower end of the latch 63 and moves the latch against the action of spring 62 to release armature bar 54, whereupon, spring 62 lifts this bar and completes the circuit between the conductors 51 and 57. This selecting and controlling of a circuit is utilized at a distant point to indicate the rise and fall of the liquid 5 through the medium of the indicating mechanism illustrated in Figs. 1, 4, and 5. By referring to the layout of the system illustrated in Fig. 1, it will be seen that binding post 58 is connected by a conductor 67 with one of the poles of the storage battery 68, or other source of electrical energy. The opposite pole of this battery is connected by a conductor 69, with one of the binding posts 70 of a magnet 71. One of the windings of this magnet is indicated at 72 and the return from the winding of this magnet is indicated at 73, and is connected to a binding post 74. This binding post is in turn connected by a conductor 75 with binding post 50. Binding post 48 is connected by a conductor 76 with a binding post 77 of a magnet 78. One of the terminals of the winding of this magnet is indicated at 79 and is connected to binding post 77. The opposite terminal of this magnet is indicated at 80 and leads to and is connected to post 70 which post is connected by a conductor 79ª to a contact element 82 that is carried by the armature bar 81 of magnet 78. A complemental contact member 83 is carried by a sheet metal housing 84 that is secured by screws 85 upon the top of the magnet. This contact member 83 is connected by a conductor 86 with a binding post 87. This binding post 87 is connected by a conductor 88 with the binding post 61. The binding post 87 is also connected by a conductor 89 to a contact element 90 mounted upon the housing 91 that is secured by screws 92 upon the top of magnet 71. The complemental member 93 is carried by the armature bar 94 of magnet 71 and is connected by a conductor 95 to the binding post 70.

Mounted within the casing 96 within which the indicating mechanism is inclosed, is a ratchet wheel 97 that is engaged by a pair of locking pawls 98 and 99 that are pivoted at 100 and 101 and are normally held by springs 102 and 103 into engagement with ratchet wheel 97. These pawls are provided with tails 104 and 105 that are adapted to be engaged by releasing fingers 106 and 107 that are pivoted at 108 and 109 to extensions of the armature bars. pawls 110 and 111 are pivotally mounted upon the ends of the armature bars and carry tails 112 and 113 that are arranged to engage at the proper time with screws 114 and 115 carried by the housings 84 and 91. Springs 116 and 117 normally tend to hold these pawls into engagement with the teeth of ratchet wheel 97. The armature bars 81 and 94 are normally forced upwardly by springs, one of which is indicated at 118, and since these springs 118 are stronger than the springs 116 and 117, it follows that when the magnets 71 and 78 are not energized, the armature bars will be forced upwardly and the contact of the tails 112 and 113 with screws 114 and 115 will result in moving the pawls 110 and 111 out of engagement with the teeth of the ratchet wheel. When these armature bars move upwardly the releasing fingers move over the tails 104 and 105 of the locking pawls 99, this action being permitted by the fact that these releasing fingers are pivoted at 108 and 109 and that they have extensions "a" which engage with pins "b" of the extensions of the armature bars, so that these releasing fingers are capable of swinging movement in one direction but not in the other. The ratchet wheel 97 is mounted upon a shaft 119 which carries a pointer 120 that moves over a dial 121.

Assuming that the disk 23 is moved in a clockwise direction in Fig. 3, the action of the parts heretofore described will complete a circuit as follows: from the battery 68 conductor 67, binding post 58, conductor 57, contact 56, contact 52, conductor 51, switch 38, contact 46, conductor 49, binding post 50, conductor 75, binding post 74, magnet 71, binding post 70, and conductor 69, back to battery 68. This will result in drawing the armature bar 94 downwardly and the initial movement of this bar downwardly will first cause releasing finger 107 to release the locking pawl 99 and by this time tail 113 will have moved out of engagement with screw 115 and pawl 111 will engage the ratchet wheel 117 to impart a movement to pointer 120 to move it one division upon the dial 121. As soon as the releasing finger 107 slips off of the tail 105 of locking pawl 99, this pawl immediately moves back into engagement with the ratchet wheel to prevent over-throw of parts and to make the pointer 120 register accurately with the division mark. At the completion of the movement contact 93 moves into engagement with contact 90 and a circuit is completed as follows: from battery 68 to conductor 69, binding post 70, conductor 95, contacts 93, and 90, conductor 89, binding post 87, conductor 88, binding post 61, conductor 60, magnet 55, branch conductor 59, conductor 57, binding post 58, conductor 67 to battery 68, whereby magnet 55 is energized, the armature bar 54 is drawn downwardly, and the circuit heretofore described as energizing magnet 70 is broken at the contacts 52 and 56. Consequently armature bar 94 immediately arises under the influence of spring 118, and the parts are restored to the proper position to repeat the operation heretofore described. And since this return of the armature bar 94 breaks the circuit that energizes magnet 55, at the contacts 90 and 93, and the armature bar 54 is thereafter held in its depressed position by the latch 63, it follows that this apparatus uses no current except when the indicating hand 120 is actually being moved. Therefore, a battery once charged will last for many months, and a device that is extremely economical in operation is secured.

It is thought that the operation of the device in the opposite direction will be readily apparent, but it may be stated that the closing of the circuit to energize magnet 78 is as follows: from the battery through conductor 67, binding post 58, conductor 57, contacts 56 and 52, conductor 51, switch 38, contact 45, conductor 47, binding post 48, conductor 76, binding post 77, through the magnet windings, conductor 80, binding post 70, and through conductor 69 back to the battery. When the armature bar 81 is drawn downwardly a circuit is completed from the battery through conductor 69, binding post 70, conductor 79ª, contacts 82 and 83, binding post 87, conductor 88, binding post 61, conductor 60, branch 59, conductor 57, binding post 58, and conductor 67 back to the battery. While any desired number of graduations may be placed upon the dial and any desired proportion be resorted to in determining the frequency of the actuation of the pointer 120 for a given rise of the water, I have here shown the local indicator comprising pointer 16 as being moved from "0" to "1" to indicate one foot for one complete rotation of grooved pulley 8. Disk 23 carries five of the lugs 24, and since this disk is fast upon the same shaft pulley 8 is fast upon, it follows that each lug represents two-tenths of a foot. Therefore, each graduation mark upon the dial 121 indicates two-tenths of a foot and the numerals indicate feet, and I preferably arrange these numerals to indicate "plus" or "minus" upon opposite sides of a certain point. However, the arrangement of the graduations may be varied at will.

From the foregoing description it will be seen that there is provided in this apparatus efficient means for recording the level of a body of water at a distant point. This being accomplished electrically, expensive, unreliable, and cumbersome mechanical connections are avoided, overthrow of the parts is positively guarded against, so that an accurate movement of the indicator is assured; no current is used except when the device is actually operating to produce a change in the reading; the switch is positively moved to select and close its circuit before the weight acts to complete the circuit, and thereby burning and pitting of the contact points is avoided. It is highly undesirable in devices of this character to have the contact elements directly carried by and movable with the float, for the reason that where the rise of the water is a slight one, and it usually is, when these contact points get nearly into contact with each other, arcing results and the contact points are badly burned and pitted. Furthermore, in devices where the contact points are directly carried by the float, when they get nearly into contact with each other, there may be an irregular movement of the float that will cause contact to be made and momentarily broken and then made again. In the present apparatus all these possible weaknesses are effectually guarded against.

While the elements shown and described are well adapted to serve the purposes for which they are intended, it is to be understood that the invention is not limited to the precise construction set forth, but includes within its purview such changes as may be made within the scope of the appended claims.

Having described my invention what I claim is:

1. In a device for indicating a liquid level at a distant point, the combination with a switch closing mechanism, of means actuated by the rise and fall of a liquid for actuating said mechanism, an electrically actuated indicator at a distant point, electrical means for actuating said indicator, an electric circuit leading from said means to said switch, a circuit closing element included in said circuit, means for actuating said circuit closing element electrically and means for actuating said circuit closing element mechanically, a circuit in which the electrical actuating means of said circuit closing member is included, and circuit closing elements in said last named circuit which are actuated and controlled by the electrical actuating means of said electrical indicator, and adapted and arranged to maintain the last named circuit open during the time that the electrical actuating mechanism of the indicator is deënergized and to close said circuit at the completion of the operating movement of said mechanism.

2. In a device for indicating a liquid level at a distant point, the combination with a switch closing mechanism, of means actuated by the rise and fall of a liquid for actuating said mechanism, an electrically actuated indicator at a distant point, electrical means for actuating said indicator, an electric circuit leading from said means to said switch, a circuit closing element included in said circuit, means for actuating said circuit closing element electrically and means for actuating said circuit closing element mechanically, a circuit in which the electrical actuating means of said circuit closing member is included, and circuit closing elements in said last named circuit which are actuated and controlled by the electrical actuating means of said electrical indicator, and adapted and arranged to maintain the last named circuit open during the time that the electrical actuating mechanism of the indicator is deënergized and to close said circuit at the completion of the operating movement of said mechanism, the closing of the last named circuit serving to energize the electrical actuating means of the circuit closing member and to actuate said circuit closing member, and a latch for holding said circuit closing member in the position to which it is moved by said electrical actuating means.

3. In a device for indicating a liquid level at a distant point, the combination with a switch closing mechanism, of means actuated by the rise and fall of a liquid for actuating said mechanism, an electrically actuated indicator at a distant point, electrical means for actuating said indicator, an electric circuit leading from said means to said switch, a circuit-closing element included in said circuit, means for actuating said circuit closing element electrically and means for actuating said circuit closing element mechanically, a circuit in which the electrical actuating means of said circuit closing member is included, and circuit closing elements in said last named circuit which are actuated and controlled by the electrical actuating means of said electrical indicator, and adapted and arranged to maintain the last named circuit open during the time that the electrical actuating mechanism of the indicator is deënergized and to close said circuit at the completion of the operating movement of said mechanism, the closing of the last named circuit serving to energize the electrical actuating means of the circuit closing member and to actuate said circuit closing member, and a latch for holding said circuit closing member in the position to which it is moved by said electrical actuating means, and means actuated by the switch closing mechanism for engaging and releasing said latch.

4. In a device for indicating a liquid level at a distant point, the combination with a switch closing mechanism, of means actuated by the rise and fall of a liquid for actuating said mechanism, an electrically actuated indicator at a distant point, electrical means for actuating said indicator, an electric circuit leading from said means to said switch, a circuit closing element included in said circuit, means for actuating said circuit closing element electrically, and means for actuating said circuit closing element mechanically, a circuit in which the electrical actuating means of said circuit closing member is included, and circuit closing elements in said last named circuit which are actuated and controlled by the electrical actuating means of said electrical indicator, and adapted and arranged to maintain the last named circuit open during the time that the electrical actuating mechanism of the indicator is deënergized and to close said circuit at the completion of the operating movement of said mechanism, the closing of the last named circuit serving to energize the electrical actuating means of the circuit closing member and to actuate said circuit closing member, and a latch for holding said circuit closing member in the position to which it is moved by said electrical actuating means, and means actuated by the switch closing mechanism for engaging and releasing said latch after said switch closing mechanism has completed its movement.

5. In a device for indicating a liquid level at a distant point, the combination with a switch closing mechanism, of means actuated by the rise and fall of a liquid for actuating said mechanism, an electrically actuated indicator at a distant point, electrical means for actuating said indicator, an electric circuit leading from said means to said switch, a circuit closing element included in said circuit, means for actuating said circuit closing element electrically and means for actuating said circuit closing element mechanically, a circuit in which the electrical actuating means of said circuit closing member is included, and circuit closing elements in said last named circuit which are actuated and controlled by the electrical actuating means of said electrical indicator, and adapted and arranged to maintain the last named circuit open during the time that the electrical actuating mechanism of the indicator is deënergized and to close said circuit at the completion of the operating movement of said mechanism, the closing of the last named circuit serving to energize the electrical actuating means of the circuit closing member and to actuate said circuit closing member, and a latch for holding said circuit closing member in the position to which it is moved by said electrical actuating means, and a swingingly mounted weight arranged to be lifted by the switch closing mechanism, which, when released, engages said latch to release said circuit closing member.

6. In a device for indicating a liquid level at a distant point, the combination with a switch closing mechanism, of means actuated by the rise and fall of the liquid for actuating said mechanism, an indicator at a distant point, a magnet for actuating said indicator, an armature bar arranged to be attracted by said magnet, a circuit closing element carried by said armature bar, an electric circuit in which said magnet and said switch are included, a circuit closing element in said circuit, a magnet for actuating the last named circuit closing element, and a circuit in which the last named magnet and the first named circuit closing element are included.

7. In a device of the character described the combination with an indicating mechanism of electrical means for actuating said indicating mechanism, comprising a pair of magnets, one of which when energized actuates said indicating mechanism in one direction and the other of which when energized actuates said indicating mechanism in the opposite direction, a float controlled switch, a pair of circuits, one or the other of which is closed at a time to actuate one or the other of said magnets, a circuit controlling mechanism common to both of said circuits and arranged to be electrically actuated and to break the circuit of said magnets when actuated electrically and circuits controlled by the energizing of the magnets of the indicator and arranged to be closed when said magnets are energized and thereby electrically actuate said mechanism to open the first named circuits.

8. In a device of the character described, the combination with an indicator comprising a pair of magnets, an indicating element actuated in one direction when one of said magnets is energized and actuated in the opposite direction when the other of said magnets is energized, a pair of circuits for said magnets, a switch for completing said one or the other of said circuits at a given time and common to both of said circuits, a magnet having a movable armature bar, circuit controlling elements carried by said armature bar and arranged to control the common portion of the circuits to the first named magnets, mechanical means normally tending to move the armature bar to close said circuit, an additional circuit leading to the last named magnet which is closed by the energizing of the first named magnets and means for holding the armature bar of the last named magnet against the action of its mechanical actuating means after said last named magnet has been energized.

9. In a device of the character described, the combination with an indicator comprising a pair of magnets, an indicating element actuated in one direction when one of said magnets is energized and actuated in the opposite direction when the other of said magnets is energized, a pair of circuits for said magnets, a switch for completing said one or the other of said circuits at a given time and common to both of said circuits, a magnet having a movable armature bar, circuit controlling elements carried by said armature bar and arranged to control the common portion of the circuits to the first named magnets, mechanical means normally tending to move the armature bar to close said circuit, an additional circuit leading to the last named magnet which is closed by the energizing of the first named magnets, means for holding the armature bar of the last named magnet against the action of its mechanical actuating means after said last named magnet has been energized, and mechanical means in which power is stored during the closing movement of the switch which acts after the completion of the closing movement of the switch to release said holding means.

In testimony whereof I affix my signature in presence of two witnesses.

SETH Q. KLINE, Jr.

Witnesses:
FRANK T. CAMPBELL,
SETH Q. KLINE.